United States Patent [19]
Hunter

[11] 3,850,140
[45] Nov. 26, 1974

[54] WEIR TYPE FABRIC SATURATOR

[76] Inventor: Edward E. Hunter, 2573 Benton St., Akron, Ohio 44312

[22] Filed: July 19, 1973

[21] Appl. No.: 380,638

[52] U.S. Cl. .............................................. 118/405
[51] Int. Cl. .............................................. B05c 3/12
[58] Field of Search............ 118/404, 405, DIG. 19, 118/423, 424, 419, 420, 429; 117/114–115

[56] References Cited
UNITED STATES PATENTS

| | | | |
|---|---|---|---|
| 2,254,216 | 9/1941 | Gordon.............................. | 118/405 |
| 2,405,220 | 8/1946 | Mann.............................. | 118/405 X |
| 3,389,010 | 6/1968 | Burch.............................. | 118/405 X |
| 3,453,987 | 7/1969 | St. Laurent...................... | 118/405 X |
| 3,471,322 | 10/1969 | Medney.......................... | 118/405 X |
| 3,544,388 | 12/1970 | Russell............................ | 118/405 X |
| 3,557,752 | 1/1971 | Hakanson..................... | 118/405 UX |
| 3,620,805 | 11/1971 | Martin............................. | 118/405 X |

*Primary Examiner*—Morris Kaplan
*Attorney, Agent, or Firm*—F. W. Brunner; H. E. Hummer

[57] ABSTRACT

An apparatus used in coating tire cord fabric with a liquid for promoting the bond between the fabric and rubber material used in the production of tires. The apparatus includes a dip tank having a pair of opposing weirs over which liquid bonding agent flows. Suitable means are provided for guiding the tire cord fabric across the weirs and through the liquid bonding agent overflowing the weirs.

6 Claims, 3 Drawing Figures

PATENTED NOV 26 1974   3,850,140

WEIR TYPE FABRIC SATURATOR

BACKGROUND OF THE INVENTION

The invention is particularly well suited for use in the treatment of tire cord fabric with a latex base adhesive for coating the tire cords and increasing the bond between the cords and rubber material used in the production of tires. This treatment is presently accomplished by passing tire cord fabric over a roller submerged in the liquid adhesive. A suitable seal for the roller bearings against the liquid adhesive, has not yet been found. Thus, in existing units, the liquid adhesive seeps into, and eventually ruins the bearings of the rollers, thereby necessitating frequent shutdowns of the dipping operation to replace the roller with the worn bearings. The invention is directed to solving this particular problem by eliminating the roller within the dip tank.

Briefly stated, the invention is in an apparatus used in coating tire cord fabric with a liquid for promoting the bond between the fabric and rubber material used in the production of tires. The apparatus comprises a reservoir for holding the liquid coating. The reservoir has at least one weir for holding back the liquid coating and over which the liquid coating can flow. Means are provided outside the reservoir for guiding the tire cord fabric across the weir and through liquid coating overflowing the weir. Means are supplied for receiving liquid coating overflowing the weir and recirculating it to the reservoir.

DESCRIPTION OF THE DRAWING

The following description of the invention will be better understood by having reference to the annexed drawing, wherein.

DESCRIPTION OF THE INVENTION

Figure 1:
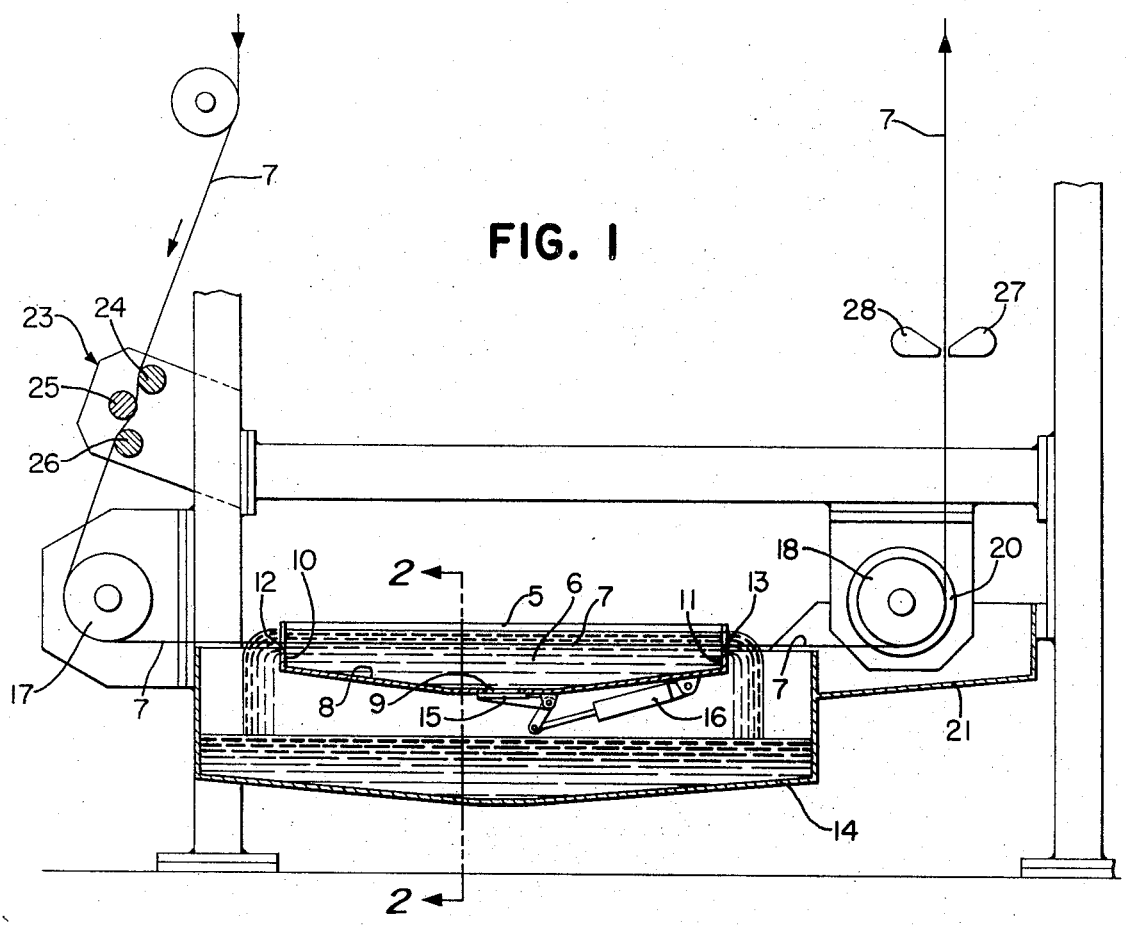
FIG. 1 is a schematic of an apparatus made in accordance with the invention, illustrating the reservoir and tank in cross-section.

Referring generally to the drawing, there is shown a reservoir 5 for holding a latex base adhesive 6 which is used for coating tire cord fabric 7 to increase the bond between the tire cords of the fabric 7 and rubber material used in the production of tires. The reservoir 5, in this instance, is rectangular in shape and has a bottom 8 which is sloped to a discharge opening 9. The reservoir 5 is provided with a pair of opposing weirs 10 and 11 for damming up the adhesive 6 within the reservoir 5 and controlling the level of adhesive within the reservoir 5.

The weirs 10 and 11 are supplied with parallel edges 12 and 13 over which the liquid adhesive 6 flows into an adjacent storage tank 14 which is disposed in juxtaposed relation below the reservoir 5. The storage tank 14, as best seen in FIG. 1, is larger than the reservoir 5 and extends outwardly beyond the weirs 10 and 11 to receive liquid adhesive 6 overflowing the weirs 10 and 11.

A pivotally mounted valve 15 is seated against the discharge opening 9 of the reservoir 5. An air cylinder 16 is conventionally coupled to the valve 15 and used for rotating it into and out of position for closing the discharge opening 9. The adhesive 6 can be immediately drained from the reservoir 5 into the storage tank 14 by rotating the valve 15 to open the discharge opening 9.

Figure 2:
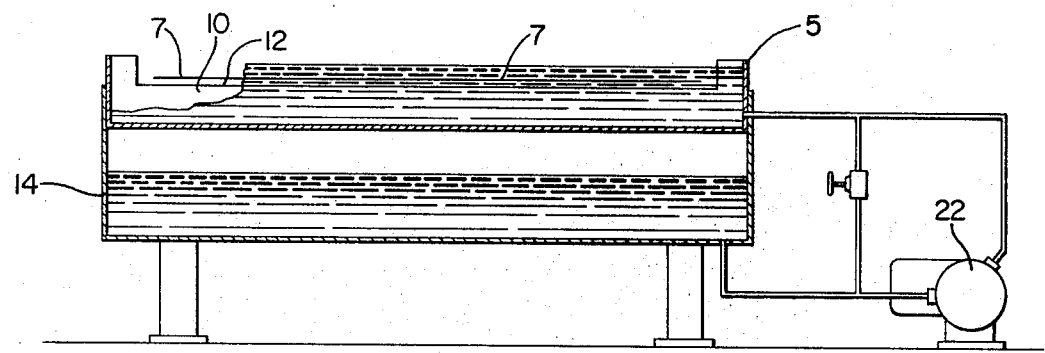
FIG. 2 is a section of the apparatus viewed from the line 2—2 of FIG. 1.
Figure 3:
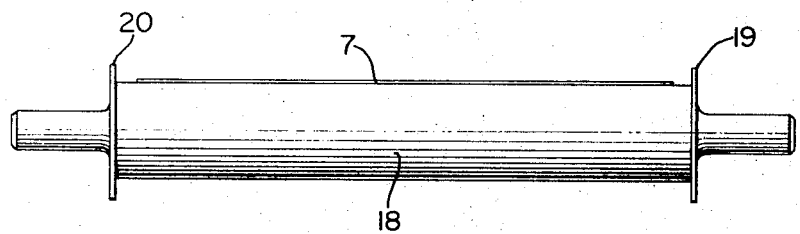
FIG. 3 is a side view of a roller used in guiding the fabric through the liquid coating overflowing the weirs of the reservoir.

A pair of front and rear rollers 17 and 18 are positioned outside the reservoir 5 and used for guiding the tire cord fabric 7 successively across the weirs 10 and 11 and through liquid coating 6 overflowing the top edges 12 and 13 of the weirs 10 and 11. Liquid adhesive 6 spills over the weirs 10 and 11 in two opposing directions, both of which parallel the direction in which the fabric 7 moves through the reservoir 5 and across the weirs 10 and 11. The front and rear guide rollers 17 and 18 are mounted for rotation about parallel axes which are parallel to the top edges 12 and 13 of the weirs 10 and 11. The guide rollers 17 and 18 are positioned for moving the fabric 7 in a horizontal plane across the weirs 10 and 11. The rear guide roller 18 is located just beyond the reservoir 5, and is provided with a pair of conventional slinger seals 19 and 20 for keeping liquid adhesive 6, carried by the fabric 7, from splashing or flowing into the bearings of the rear guide roller 18. Excess liquid coating drips or is flung from the rear guide roller 18 into an adjacent discharge basin 21 which returns the liquid coating to the main storage tank 14. A pump 22, as best seen in FIG. 2, is used for pumping liquid coating 6 from the storage tank 14 into the reservoir 5.

A device 23 is positioned upstream from the front guide roller 17, for spreading at least the individual strands of each tire cord, prior to moving the fabric 7 into contact with the liquid coating 6. The spreader 23 comprises a plurality of strategically located rolls 24–26 for contacting and deflecting the fabric 7 in alternate directions to spread the strands or filaments of the individual tire cords.

A pair of air knives 27 and 28 are located downstream from the rear guide roller 18 for directing streams or jets of air, under pressure, against the freshly coated fabric 7 to deweb the fabric, i.e., remove any liquid coating clogging or closing the interstices or spaces between the interwoven warp cords and weft threads of the tire cord fabric 7.

Thus, there has been described a device useful for continually dipping tire cord fabric in a liquid adhesive without necessitating frequent shutdowns to remove defective bearings of guide rollers submerged in the adhesive and ruined by seepage of the adhesive into the bearings.

What is claimed is:

1. An apparatus used in coating fabric with a liquid for promoting the bond between warp cords of the fabric and elastomeric material, comprising:

a. a reservoir for holding liquid coating, having a pair of weirs formed in opposed walls of the reservoir;

b. a storage tank operatively associated with said reservoir for receiving liquid coating overflowing the weirs;

c. a quick-drain flap valve disposed at the bottom of said reservoir for releasing liquid coating in said reservoir to said tank;

d. means for circulating liquid coating from said tank to said reservoir such that liquid coating overflows said weirs;

e. means upstream and downstream of said reservoir for guiding fabric across said weirs and through liquid coating overflowing said weirs to effect coating of the fabric;
f. said downstream guide means comprising a roll member having flange elements at the ends thereof comprising splash guards; and
g. said downstream guide roll member being in communication with said tank such that liquid coating, leaving the coated fabric as the fabric contacts said roll member, returns to said tank.

2. The apparatus of claim 1, wherein the tank is in vertical spaced relation below the reservoir, and extends outwardly beyond the weirs.

3. The apparatus of claim 1, wherein the weirs include parallel edges which liquid coating overflows, said edges being in the same horizontal plane when the reservoir is in position for coating fabric.

4. The apparatus of claim 1, wherein the upstream guide means conprises a roll member and each roll member is spaced from its associated weir, and means for mounting the rollers for rotation about parallel axes in the same plane which is parallel to the plane containing the edges of the weirs.

5. The apparatus of claim 1, which includes means disposed upstream from the reservoir for spreading at least the strands forming each tire cord of the fabric, prior to passing the fabric across the first to encounter weir.

6. The apparatus of claim 1, wherein pneumatic means operate the flap valve.

* * * * *